July 2, 1940.　　　　　G. A. DUREN　　　　　2,206,530
PLUMB BOB ADJUSTING AND COUNTERBALANCE DEVICE
Filed Nov. 18, 1939
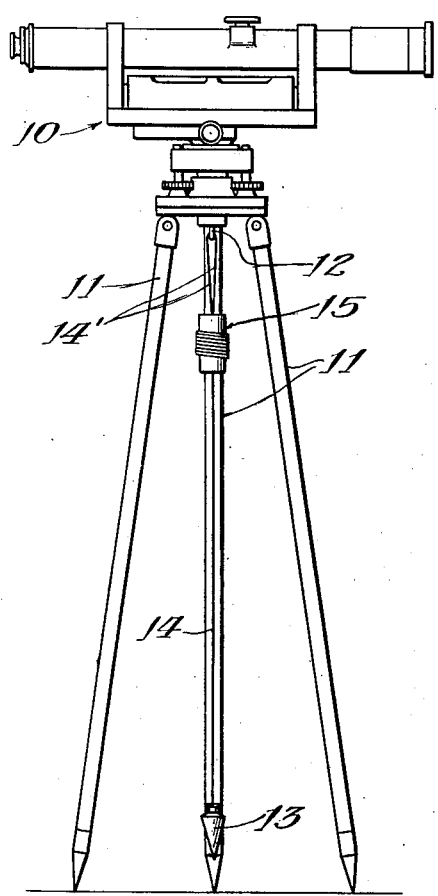
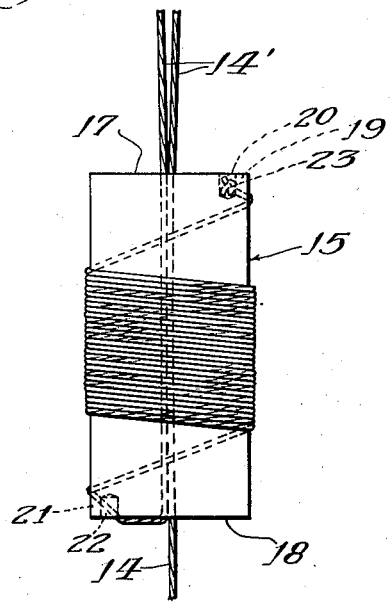
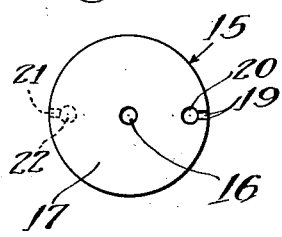
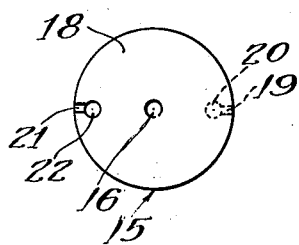
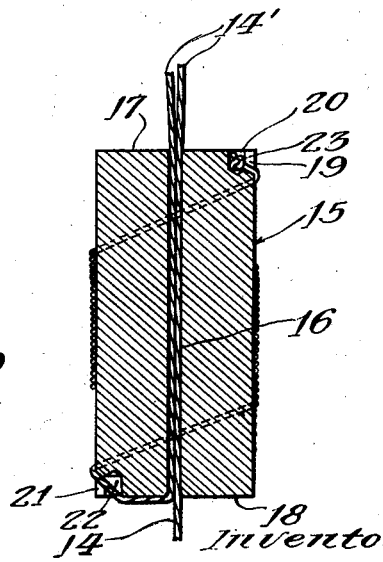
Inventor:
George A. Duren,
By: Bertha L. MacGregor
Attorney Patented July 2, 1940

2,206,530

UNITED STATES PATENT OFFICE 2,206,530

PLUMB BOB ADJUSTING AND COUNTER-BALANCE DEVICE

George A. Duren, Chicago, Ill.

Application November 18, 1939, Serial No. 305,138

5 Claims. (Cl. 33—217)

This invention relates to plumb bob adjusting and counterbalance devices.

The main object is to provide a device of the character described which greatly facilitates the adjustment of the position of the plumb bob, substantially eliminates wear on the plumb line, and counterbalances the plumb bob when in adjusted position as well as during the adjustment.

Another object is to produce a device of the character described which is diametrically balanced and which functions to adjust the position of and to counterbalance the plumb bob without interfering with the true lateral balance of the plumb bob and line.

In the drawing:

Fig. 1 is a front elevation of a surveying instrument, tripod, plumb bob and plumb line provided with a plumb bob adjusting and counterbalance device embodying my invention.

Fig 2 is an elevational view of the plumb bob adjusting and counterbalance device of my invention.

Fig. 3 is a vertical sectional view of the device.

Fig. 4 is a top plan view of the same.

Fig. 5 is a bottom plan view of the same.

As shown in the drawing, a surveying instrument is indicated at 10, the same being supported on a tripod 11, and having a plumb line hook 12 secured to the bottom surface of the instrument 10 by any suitable means.

The preferred embodiment of my invention shown in the drawing comprises a plumb bob 13, line 14 and adjusting and counterbalance device 15. The latter may be shaped in a variety of forms, diametrically balanced, but I have shown it in the form of a simple cylinder of metal. The device 15 is provided with a longitudinal concentric bore 16 extending from its top surface 17 to the bottom 18.

At one side of the upper portion, adjacent its periphery, the cylinder is cut away to form an outwardly and downwardly inclined slot 19 and a hole 20 communicating with the upper inner end of the slot 19.

At the opposite side of the cylinder, in its lower portion, adjacent the periphery, the cylinder is cut away to form an outwardly and upwardly inclined slot 21 and a hole 22 communicating with the lower inner end of the slot 21.

The weight of the device 15 is perfectly balanced, the cut away portions 19, 20 at the top being diametrically opposite and equal to the cut away portions 21, 22 in the bottom of the cylinder.

The line 14 has the plumb bob 13 secured to one of its ends, and between its ends the line is looped as indicated at 14' and inserted through the bore 16 as shown, the free portion of the line projecting from the bottom of the device 15, and the end being knotted as indicated at 23 and held in the hole 20 in the top of the device 15. After the portion 14' of the plumb line has been looped over the hook 12, the position of the plumb bob 13 is adjusted by manipulating the line 14 and the device 15 until the plumb bob is in its intended position. The device 15 is held in its intended position, to counterbalance and adjust the plumb bob, by winding the slack portion of the line 14 on the device 15, the slack portion being that part of the line which projects from the bottom of the device 15 and terminates in the knotted end 23 engaged in the hole 20 and slot 19 at the top of the device 15.

The weight of the adjusting and counterbalance device 15 is desirably correlated to the weight of the plumb bob 13, but their weights are not necessarily identical. If slippage of the line 14 occurs, due to difference in weight of the plumb bob and the counterbalancing and adjusting device 15, the line may be wound around the hook 12 one or more times to produce snubbing action to aid the counterbalancing. To adjust the position of the plumb bob, the device 15 is raised to lower the plumb bob and the plumb bob is lifted in order to raise its position, whereby wear on the line is minimized.

As stated, the adjusting and counterbalancing device may be produced in a variety of forms provided they are balanced diametrically of the major axis of the devices.

Changes may be made in details of construction without departing from the scope of my invention.

I claim:

1. A plumb bob adjusting and counterbalance device comprising a body longitudinally and axially bored to allow a doubled length of plumb line to be threaded through the bored body, the weight of the body being laterally balanced, means on the upper portion of the body for removably engaging an end of a plumb line, and means on the opposite side of the body for balancing the first mentioned means.

2. A plumb bob adjusting and counterbalance device comprising a body longitudinally and axially bored to allow a doubled length of plumb line to be threaded through the bored body, the weight of the body being laterally balanced, the upper peripheral part of the body at one side being slotted to receive an end of a plumb line, and the lower opposite side being slotted to balance the device and to receive a portion intermediate the ends of the plumb line.

3. The combination of a plumb line, a plumb bob attached to one end of the line, and an adjusting and counterbalance device axially bored and threaded on a doubled portion of the line, said device having means for retaining the free end of the line and adapted to have slack in the line wound on its body.

4. The combination of a plumb line, a plumb bob attached to one end of the line, and an adjusting and counterbalance device axially bored and threaded on a doubled portion of the line, said device being balanced laterally of the bore, having means for retaining the free end of the line and adapted to have slack in the line wound on its body.

5. Plumb bob adjusting and counterbalance device comprising a body longitudinally and axially bored to allow a doubled length of plumb line to be threaded through the bored body, means at one side of the body for removably engaging an end of a plumb line, and means on the body for balancing the first mentioned means.

GEORGE A. DUREN.